(12) United States Patent
Olson et al.

(10) Patent No.: US 6,273,242 B1
(45) Date of Patent: Aug. 14, 2001

(54) ROTARY TRANSFER APPARATUS WITH AN IN-LINE CAM MECHANISM

(75) Inventors: Allen L. Olson, Crosby; Larry A. Rasmussen, Cross Lake, both of MN (US)

(73) Assignee: Riverwood International Corporation, Atlanta, GA (US)

( * ) Notice: Subject to any disclaimer, the term of this patent is extended or adjusted under 35 U.S.C. 154(b) by 0 days.

(21) Appl. No.: 09/515,603

(22) Filed: Feb. 29, 2000

(51) Int. Cl.[7] .................................................... B65G 17/16
(52) U.S. Cl. ......................................... 198/797; 198/474.1
(58) Field of Search .............................. 198/474.1, 478.1, 198/797, 793, 802; 414/732, 756, 737

(56) References Cited

U.S. PATENT DOCUMENTS

| 4,643,633 | 2/1987 | Lashyro . |
| 4,901,843 | 2/1990 | Lashyro . |
| 5,431,274 | 7/1995 | Schaupp . |
| 5,456,570 | 10/1995 | Davis et al. . |
| 5,704,758 | 1/1998 | Davis et al. . |
| 5,910,078 | 6/1999 | Guttinger et al. . |

OTHER PUBLICATIONS

New Rotary Feeder Accommodates Products That Are Difficult To Handle; Food and Drug Packaging Magazine; Mar., 2000.

*Primary Examiner*—Kenneth W. Noland
(74) *Attorney, Agent, or Firm*—Skinner and Associates

(57) ABSTRACT

A rotary transfer apparatus, comprising: a frame structure; a rotatable main shaft supported by the frame structure; a primary body connected to the main shaft; at least one first planetary shaft rotatably connected to the primary body and rotating in relation to the main shaft; a secondary body connected to each first planetary shaft; a second planetary shaft rotatably connected to each secondary body and rotating in relation to the first planetary shaft; an article transfer mechanism connected to each second planetary shaft; and an in-line cam mechanism. The article transfer mechanism is adapted for picking and placing articles, and has at least one stem connected to the second planetary shaft. Each stem has a distal end whose motion defines a product path about the main shaft. The product path has at least one apex at which point the distal end of the stem moves in an in-line motion. The in-line cam mechanism is adapted for extending the in-line motion at the apex(es) of the product path.

20 Claims, 12 Drawing Sheets

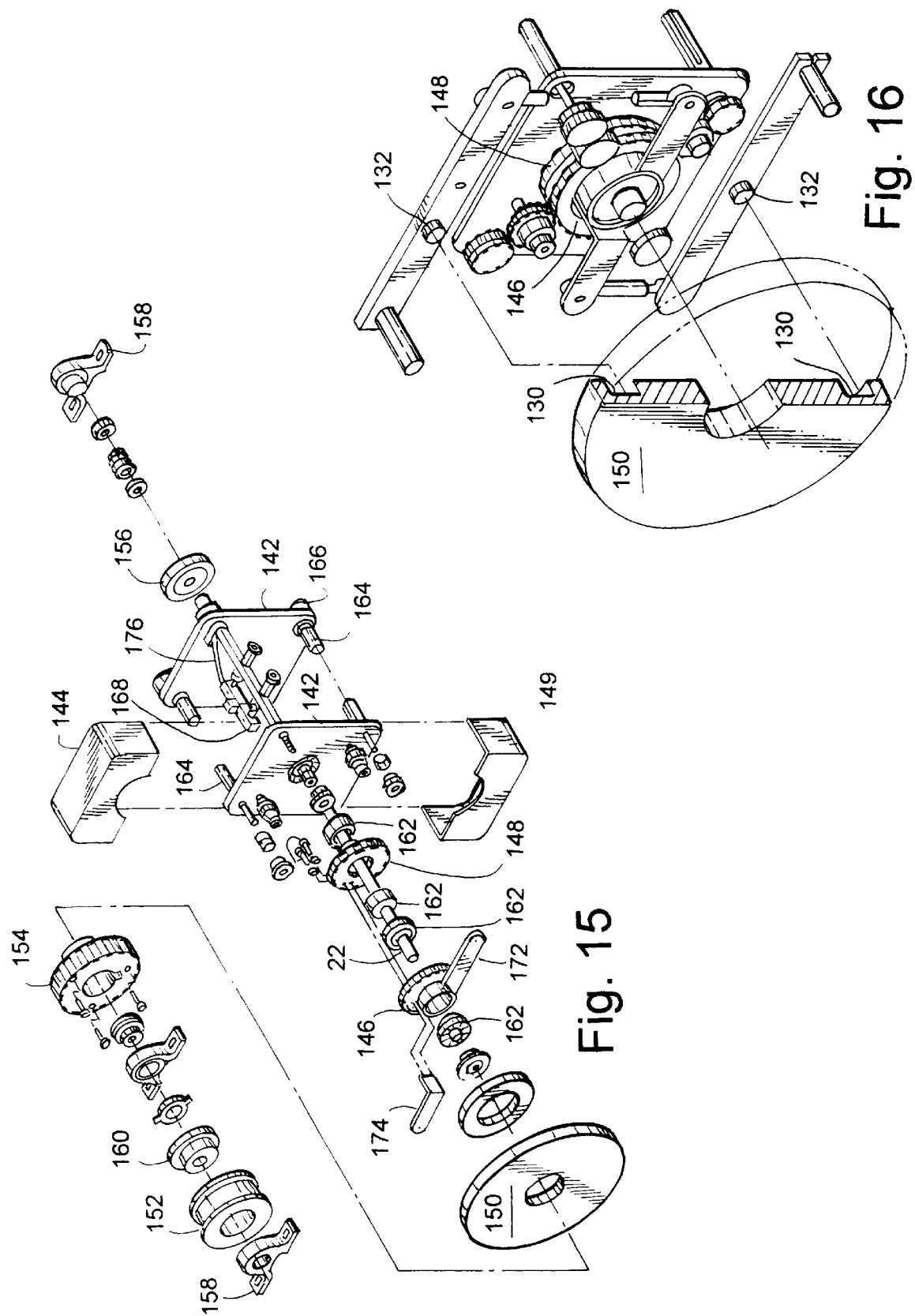

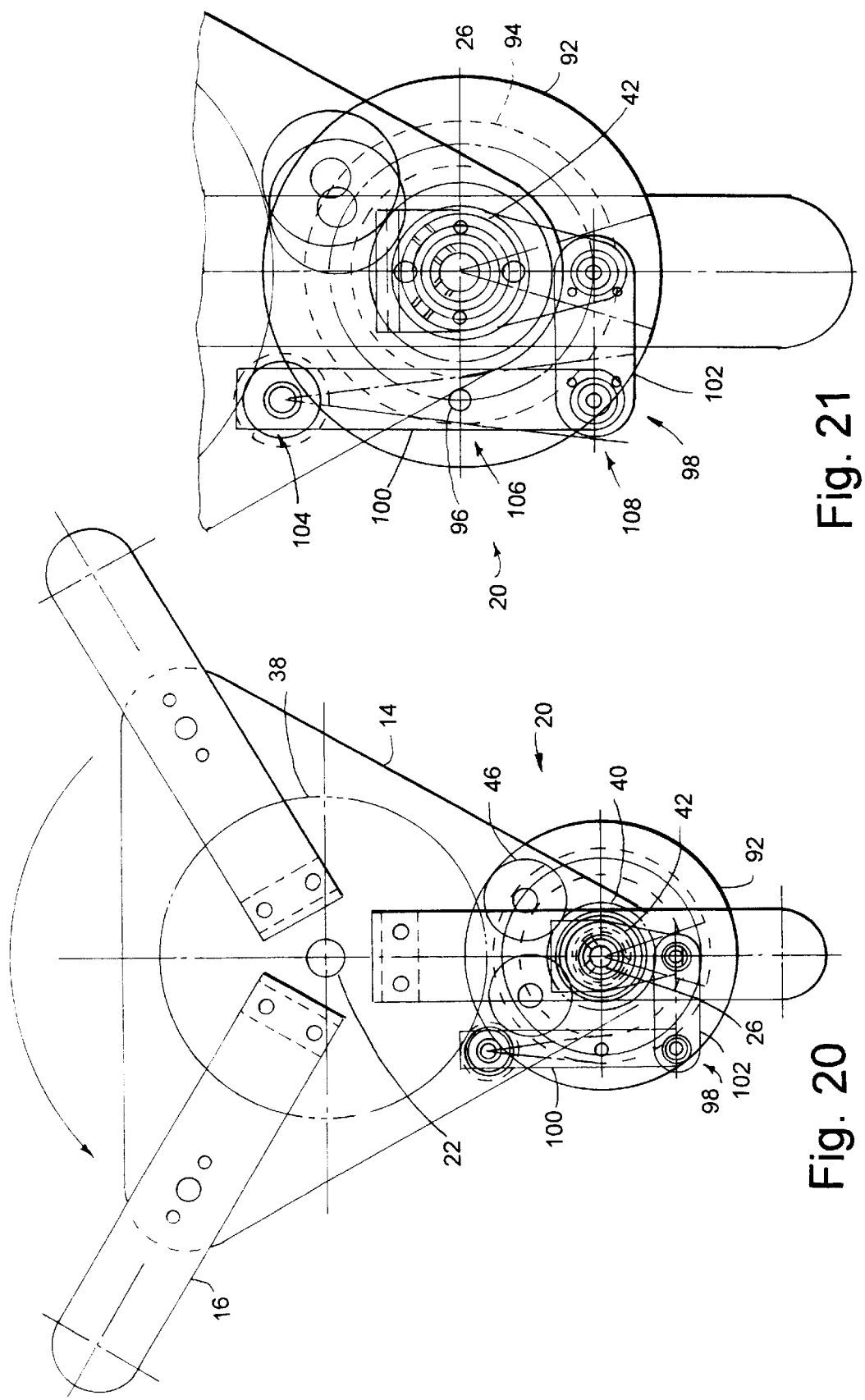

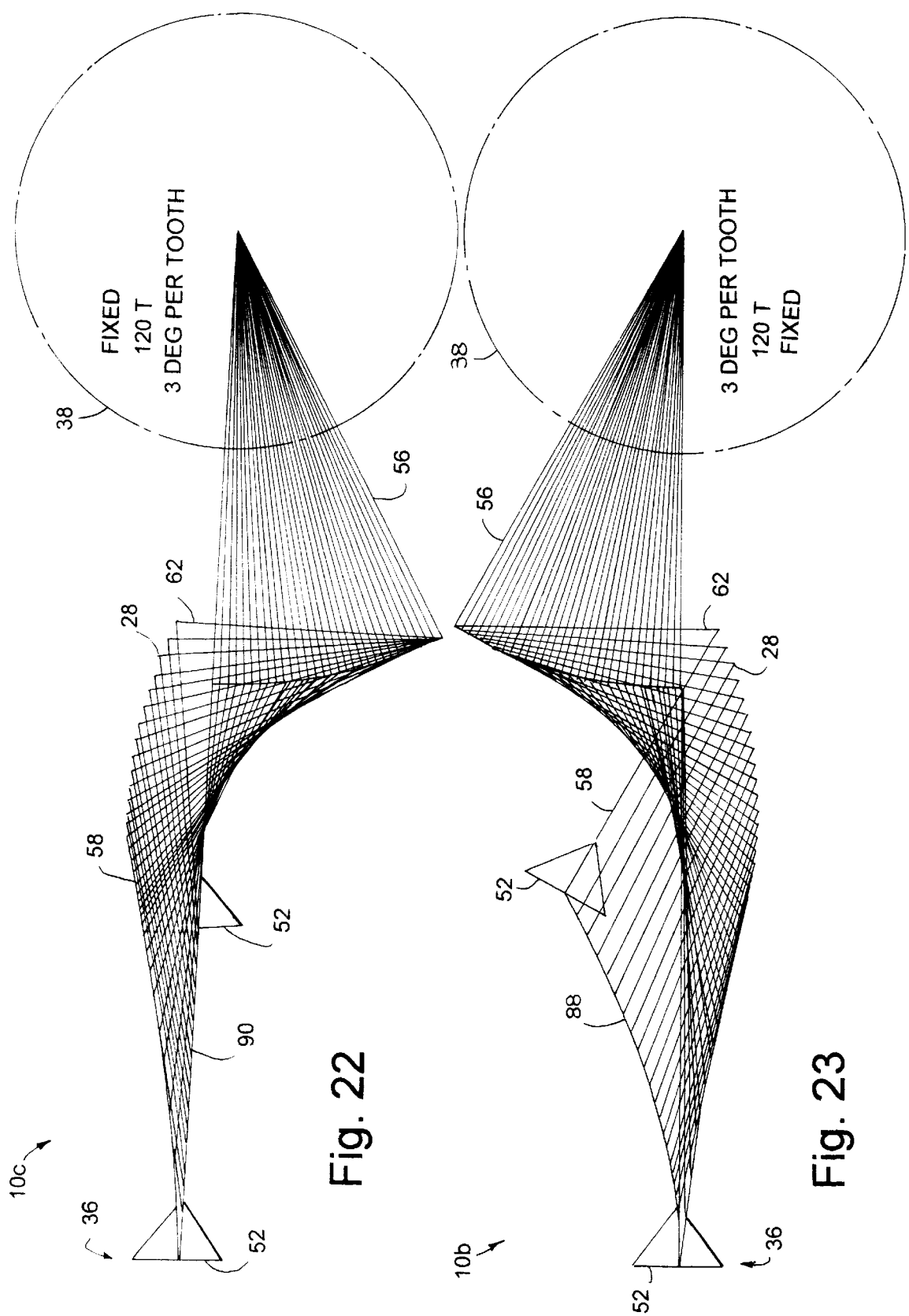

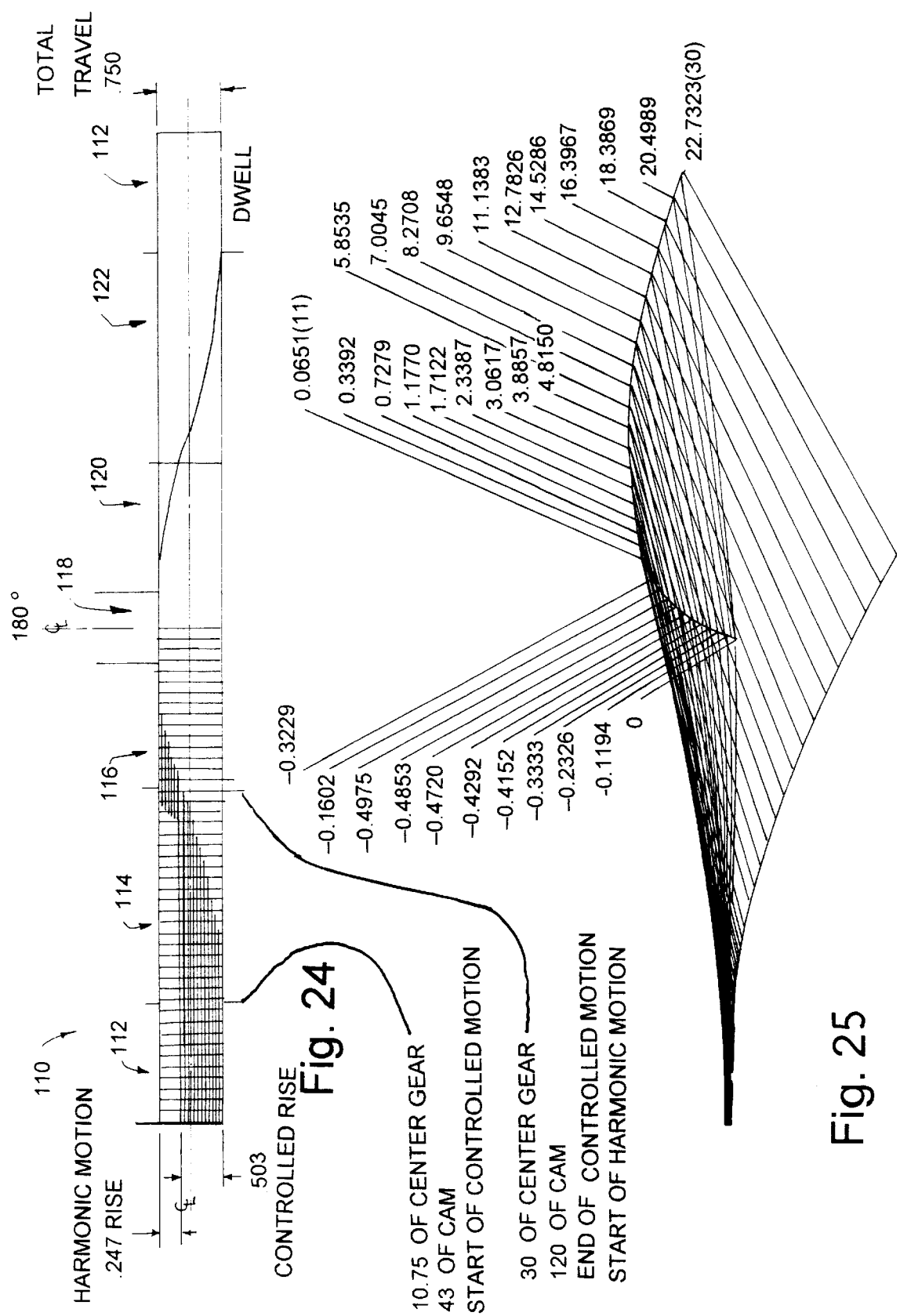

ROTARY TRANSFER APPARATUS WITH AN IN-LINE CAM MECHANISM

BACKGROUND OF THE INVENTION

1. Field of the Invention

The present invention relates, generally, to an apparatus adapted for the pickup, transfer, and the delivery of articles. More particularly, the invention relates to a rotary transfer apparatus with an in-line cam mechanism adapted for enabling an extended in-line or near in-line motion at the points of pickup and delivery.

2. Background Information

It is both necessary and desirable in manufacturing, assembly and packaging operations to pickup, transfer and deliver articles of various shapes and dimensions in a reliable, precise and high speed manner. A rotary transfer apparatus consistently reaches the desired pick and place result, although other types of such devices have been developed. A rotary transfer apparatus is shown in U.S. Pat. No. 4,643,633 which is assigned to Applicants' assignee and is herein incorporated by reference.

Known apparatus and methods for picking, transferring and placing articles are believed to have significant limitations and shortcomings. For example, due to the many configurations of manufacturing equipment and the varying shapes and sizes of the articles produced and/or processed, it is difficult to precisely and reliably pickup, transfer and place these articles without damaging them. Deeply nested articles and articles with relatively long product tails pose a particular problem. A long stem is desirable for deeply nested articles in order to extend into and securely contact the articles. Additionally, both deeply nested articles and articles with long product tails cannot be rotated too quickly near the apex points of pickup and delivery, or else they will contact and possibly damage each other. Thus it is desirable for a rotary transfer apparatus to have both a long stem and an extended in-line motion at the apex points of placement and delivery.

The rotary transfer apparatus of the present invention is believed to constitute an improvement over existing technology. An in-line cam motion is added to the secondary motion of a rotary transfer apparatus in order to provide an apparatus with a relatively long stem and an extended in-line or near in-line motion at the points of pickup and placement. This extended in-line motion promotes precise contact between the transfer mechanism and the articles and further enables the transfer apparatus to successfully pick and place both deeply nested articles and articles with relatively long product tails.

BRIEF SUMMARY OF THE INVENTION

The present invention provides a rotary transfer apparatus adapted for picking, transferring and placing articles, and generally comprises a frame structure, a primary body, and at least one secondary body, article transfer mechanism, and in-line cam mechanism. The frame structure supports a main shaft that is driven by a drive source and is adapted for rotating with respect to the frame structure. The primary body is connected to and rotates with the main shaft. At least one first planetary shaft is rotatably connected to the primary body and rotates in relation to the main shaft. The number of first planetary shafts preferably corresponds to the number of secondary bodies. Each secondary body is connected to and rotates with one of the first planetary shafts. A second planetary shaft is rotatably connected to each of the secondary bodies and rotates in relation to the first planetary shaft. Each article transfer mechanism is connected to one of the second planetary shafts and is adapted for picking, transferring and delivering/placing articles at predetermined locations. The article transfer mechanism has a stem with a distal end whose motion defines a path about the main shaft. The path has at least one apex at which point the distal end of the stem moves in an in-line motion. The in-line cam mechanism extends the in-line motion at each apex. For the purposes of this application, the term "in-line motion" is defined to include near in-line motion or close to in-line motion.

The primary body moves in a primary motion and the secondary body moves in a secondary motion. Properly timed or programmed motors, such as servo motors, could be used to drive the main shaft, first planetary shafts and second planetary shafts to produce the desired primary and secondary motions. Mechanical means for generating these motions are illustrated and disclosed below. A primary stationary gear is mounted or otherwise connected to the frame, and the main shaft extends through and rotates with respect to the primary stationary gear. A primary planetary gear is attached to each of the first planetary shafts and is in rotational communication with the primary stationary gear through a first rotation means. A secondary stationary gear is mounted or otherwise connected to the primary body, and each of the first planetary shafts extends through and rotates with respect to one of the secondary stationary gears. A secondary planetary gear is attached to each of the secondary planetary shafts and is in rotational communication with the secondary stationary gear through a second rotation means. The first rotation means for rotating the first planetary shaft about the first stationary gear comprises either a first idler gear meshingly disposed between or a continuous chain disposed about these two gears. The second means for rotating the second planetary gear about the second stationary gear, likewise, consists either of an idler gear engagingly disposed between or a second continuous chain meshingly disposed about the second stationary and the second planetary gear.

Each article transfer mechanism has a hollow shaft for the timed application of a vacuum from a vacuum source and at least one adjustable vacuum cup in communication with the hollow shaft that contacts the article at the pick location. The hollow shaft may be the secondary planetary shaft, or a portion thereof, or may be a separate shaft coaxially aligned with the secondary planetary shaft. The vacuum is applied to remove the article from the pick location, is maintained during the transfer to the placement or delivery location, and is removed to release the article at the place location. The article transfer mechanism is generally disposed outwardly from the second planetary shaft.

The rotary transfer apparatus possesses a primary motion and a secondary motion, which when timed by the use of the appropriate predetermined gearing ratios for the illustrated mechanical embodiments, provides a wide variety of available transfer paths and available article pick and delivery locations. The gear ratio between the primary planetary gear and the primary stationary gear determines the number of apex positions of travel for the remaining outer elements of the device. Any of a number of process specific operations may be performed at each of these apexes. For example, it may be desirable to pick articles at a first apex, present the articles at a second apex in order to place a label on the articles, and restack the articles or place the articles onto a conveyor at a third apex. Other processes performed at these apexes may include, for example, printing, scoring, folding, gluing and scanning. The gear ratio between the secondary planetary gear and the secondary stationary gear causes the article transfer mechanism to continually face in an outward position during its course of travel around the main shaft so that relatively large articles can be effectively transferred without contacting other articles or the apparatus, or without the need to expand the physical dimensions of the device itself.

An extended in-line motion and/or a longer stem length may be desirable or even necessary for deeply nested articles and for articles with longer product tails. A four-stop secondary motion rotary transfer apparatus enables a relatively larger stem to be used and provides a degree of in-line motion. The in-line cam mechanism applies a predetermined offset motion to the secondary stationary gear that extends, enhances or lengthens the in-line motion near the apexes of the product path. Benefits of the extended in-line motion include the ability to successfully pick deeply nested products and articles with relatively long product tails, and to restack or otherwise place these articles into a magazine or onto a conveyor.

Furthermore, it may be desired, for example, to sweep a bar code label on an article past a scanner or to accurately place the articles on a fast moving conveyor, in which case relative movement between the article and the placement location can be extremely detrimental for precise placement. An advancing cam motion, as shown in U.S. Pat. No. 4,901,843 which is assigned to Applicants' assignee and is herein incorporated by reference, may be applied to the primary stationary gear to properly match the velocity of the article with the conveyor or products traveling on the conveyor at the point of placement.

The features, benefits and objects of this invention will become clear to those skilled in the art by reference to the following description, claims and drawings.

BRIEF DESCRIPTION OF THE SEVERAL VIEWS OF THE DRAWING

FIG. 15 is an exploded perspective view of a rotary transfer apparatus having two pairs of article transfer mechanisms wherein each pair is separately attached to and independently controlled by an advancing cam mechanism.

FIG. 16 is a separated view showing the advancing cam mechanism.

FIG. 20 is a schematic front view of an in-line cam mechanism in a secondary motion rotary transfer apparatus.

FIG. 21 is a detailed view of the in-line cam mechanism of FIG. 20.

FIG. 22 is a geometric, time-location diagram showing an extended in-line transfer path of an article moving away from an apex in a four-stop, secondary motion transfer apparatus that has an in-line cam mechanism.

FIG. 23 is a geometric, time-location diagram showing the transfer path of an article moving toward an apex in a four-stop, secondary motion transfer apparatus that does not have an in-line cam mechanism.

FIG. 24 is a diagram illustrating the cam profile design for the in-line cam mechanism of FIG. 20.

FIG. 25 illustrates a method for determining the required stationary cam offset rotation for a desired in-line motion of the stem, which then can be used to design the cam profile of FIG. 24.

DETAILED DESCRIPTION

Figures 1, 2:
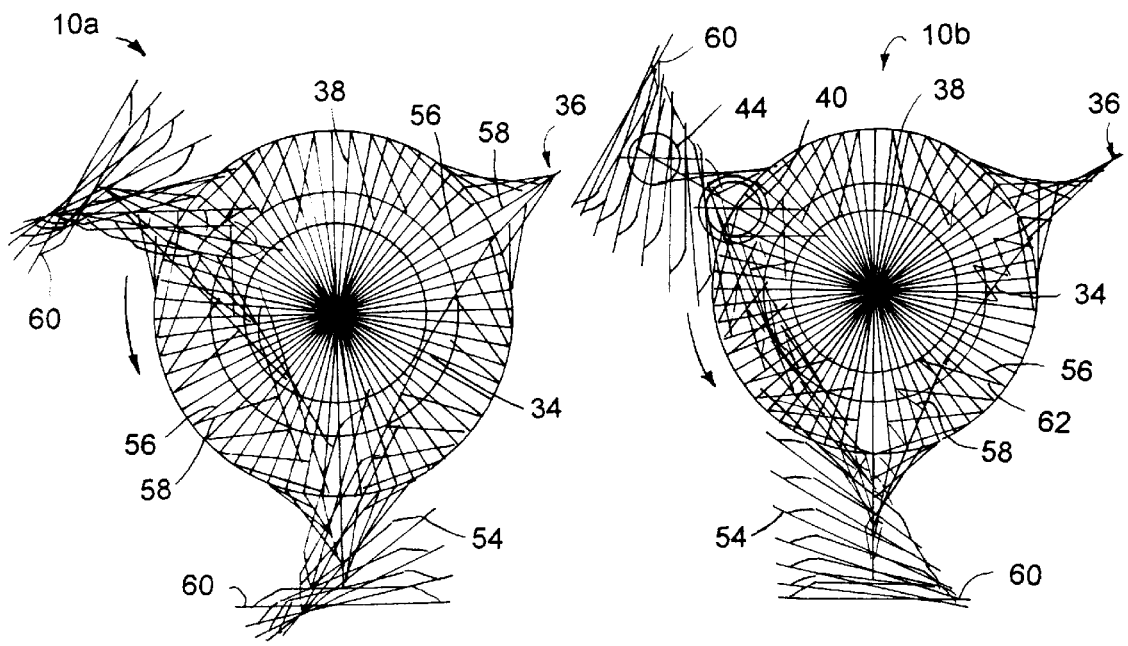
FIG. 1 is a geometric, time-location diagram which shows the transfer path of an article in a three-stop, no secondary motion rotary transfer apparatus.
FIG. 2 is a geometric, time-location diagram which shows the transfer path of an article in a three-stop, secondary motion rotary transfer apparatus.

Referring to the figures, an example of the preferred embodiment of the present invention is illustrated and generally indicated by the reference numeral 10. The rotary transfer apparatus 10 is described below first in terms of its major structural elements, then in terms of its primary and secondary motion, and then in terms of more detailed structural and/or functional elements of a secondary motion rotary transfer apparatus and the in-line cam mechanism which cooperate to precisely pickup, transfer and deliver articles from one location to another. Finally, an advancing cam mechanism which may be added to the rotary transfer apparatus is described.

Major Structural Elements

Figure 7:
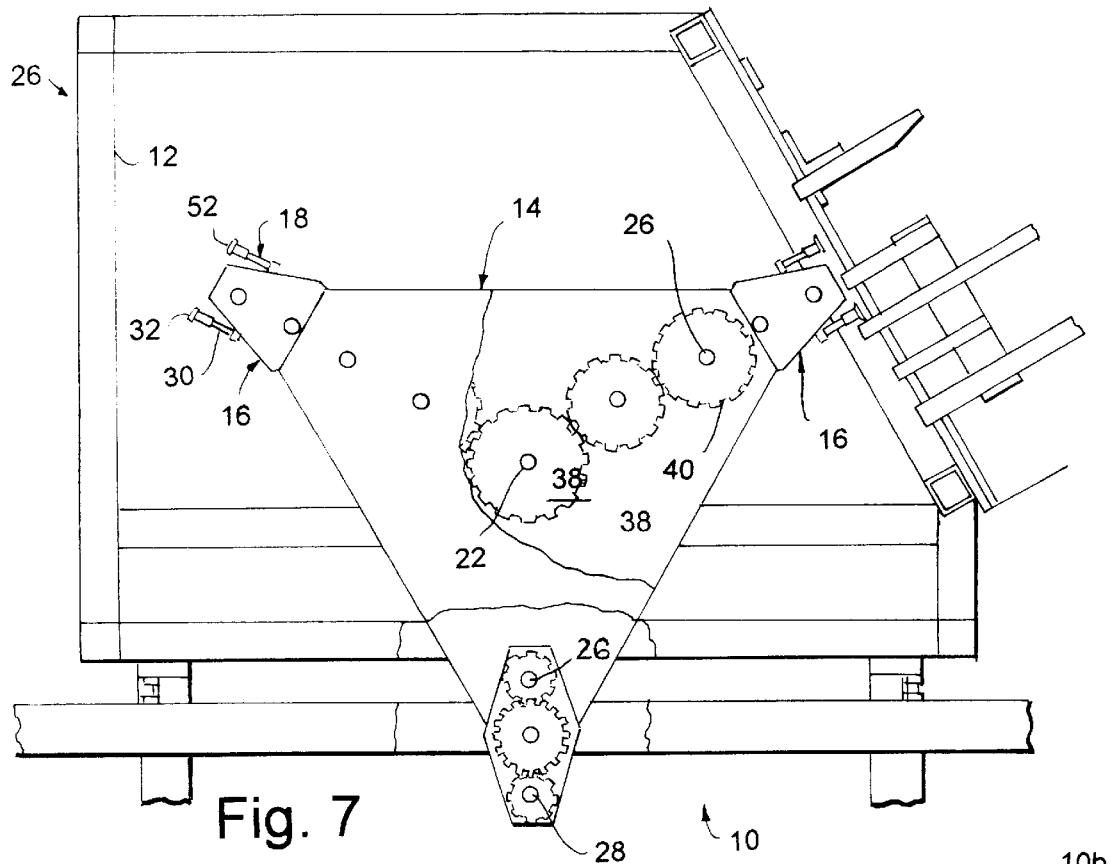
FIG. 7 is a side plan view, with cut-away portions, of a secondary motion rotary transfer apparatus that may produce the time-location diagram of FIG. 2 as a three-stop apparatus and may produce the diagram of FIG. 4 as a four-stop apparatus.
Figure 8:
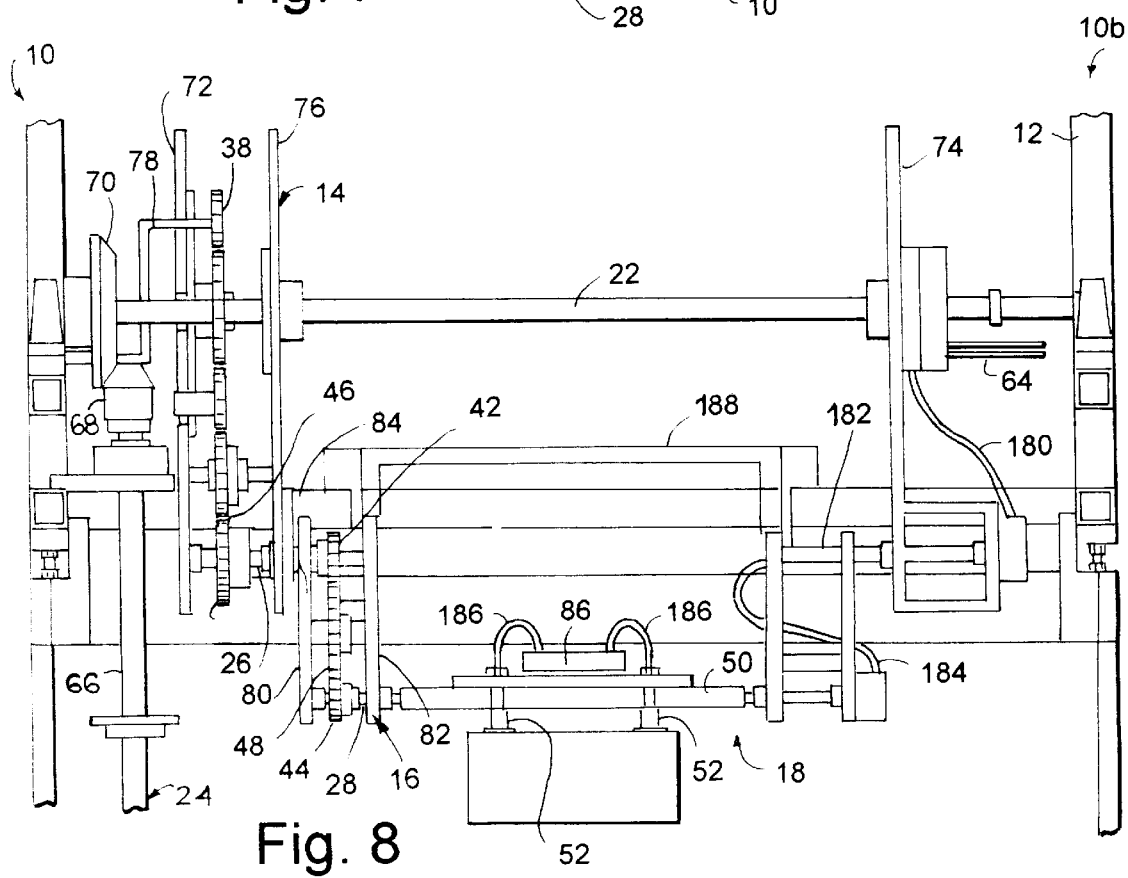
FIG. 8 is a front plan view of the rotary transfer apparatus of FIG. 7.
Figure 9:
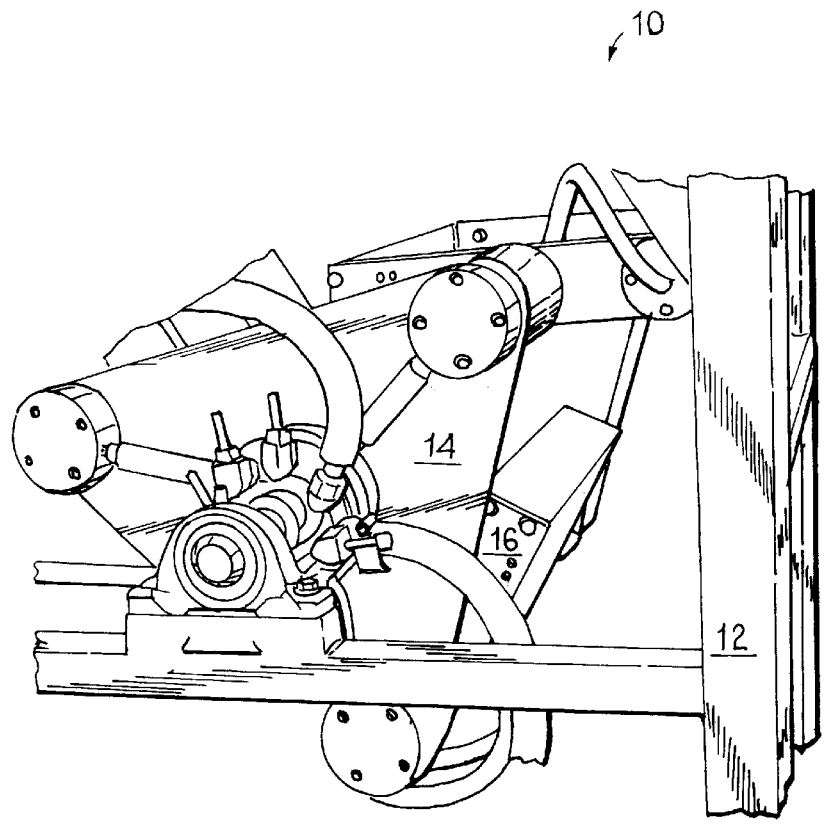
FIG. 9 is an illustration of the opposing side view for the rotary transfer apparatus of FIG. 7.
Figure 10:
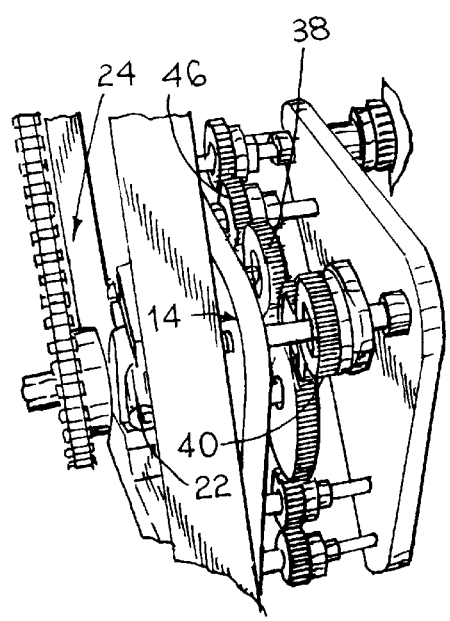
FIG. 10 is a perspective view of the first stationary gear and the first planetary and idler gears for the rotary transfer apparatus of FIG. 7.
Figure 11:
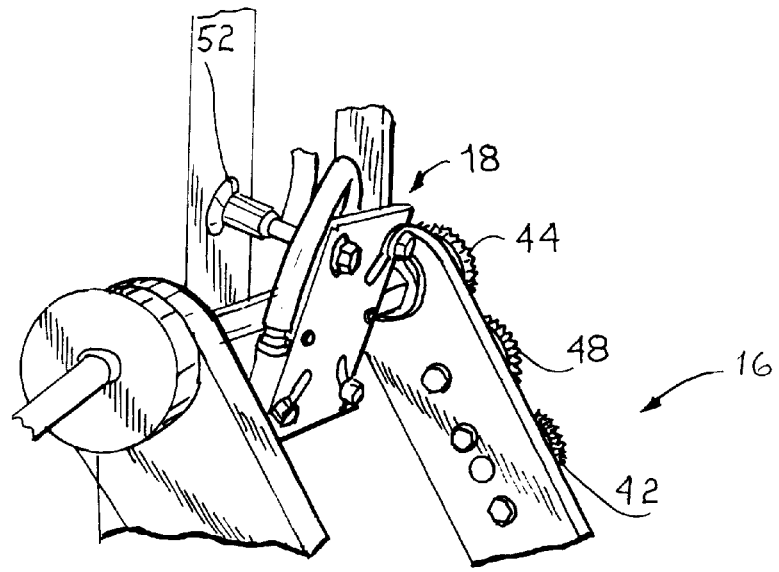
FIG. 11 is a perspective view of the second stationary and the second planetary and idler gears for the rotary transfer apparatus of FIG. 7.
Figure 12:
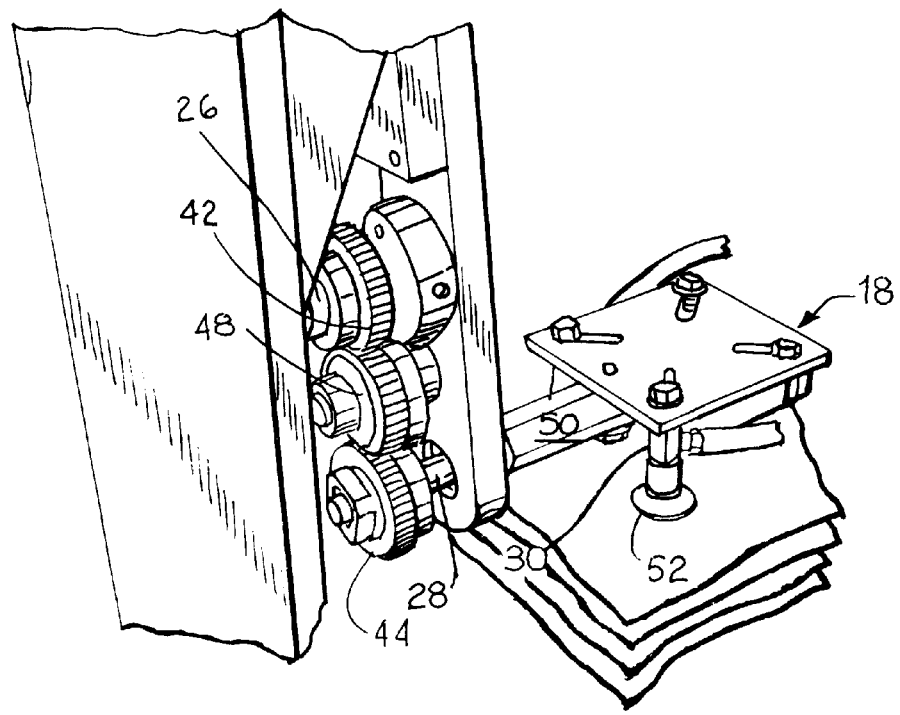
FIG. 12 is a perspective view of the second stationary and the second planetary and idler gears for the rotary transfer apparatus of FIG. 7 near the point of placement.

Referring generally to FIGS. 7–8 and 20, the rotary transfer apparatus 10 generally comprises a frame structure 12, a primary body 14, and at least one secondary body 16, article transfer mechanism 18, and in-line cam mechanism 20. The frame structure 12 supports a main shaft 22 that is driven by a drive source 24 and is adapted for rotating with respect to the frame structure 12. The primary body 14 is connected to and rotates with the main shaft 22. At least one first planetary shaft 26 is rotatably connected to the primary body 14 and rotates in relation to the main shaft 22. The number of first planetary shafts 26 preferably corresponds to the number of secondary bodies 16. Each secondary body 16 is connected to and rotates with one of the first planetary shafts 26. A second planetary shaft 28 is rotatably connected to each of the secondary bodies 16 and rotates in relation to the first planetary shaft 26. Each article transfer mechanism 18 is connected to one of the second planetary shafts 28 and is adapted for picking, transferring and delivering/placing articles at predetermined locations. The article transfer mechanism 18 has a stem 30 with a distal end 32 whose motion defines a path 34 about the main shaft 22. The path 34 has at least one apex 36 at which point the distal end 32 of the stem 30 moves in an in-line motion, which for the purposes of this application is defined to include an in-line or near in-line motion of a stem so that the radial component of an article's motion is considerably greater than the rotational component about the main shaft 22. The in-line cam mechanism 20 extends the in-line motion at each apex 36.

In the illustrated embodiment, the primary body 14 moves in a primary motion and the secondary body 16 moves in a secondary motion. A primary stationary gear 38 is mounted to the frame structure 12, and the main shaft 22 extends through and rotates with respect to the primary stationary gear 38. A primary planetary gear 40 is attached to each of the first planetary shafts 26 and is in rotational communication with the primary stationary gear 38 through a first rotation means. At least one secondary stationary gear 42 is mounted to the primary body 14, and one of the first planetary shafts 26 extends through and rotates with respect to each secondary stationary gear 42. A secondary planetary gear 44 is attached to each of the secondary planetary shafts 28 and is in rotational communication with the secondary stationary gear 42 through a second rotation means. The first rotation means for rotating the first planetary gear 40 about the primary stationary gear 38 comprises either a first idler gear 46 meshingly disposed between or a continuous chain disposed about gears 38 and 40. The second means for rotating the secondary planetary gear 44 about the secondary stationary gear 42, likewise, consists either of a second idler gear 48 engagingly disposed between or a second continuous chain meshingly disposed about the gears 42 and 44.

Each article transfer mechanism 18 has a hollow shaft 50 for the timed application of vacuum from a vacuum source and at least one adjustable vacuum cup 52 in communication with the hollow shaft 50 that contacts the article at the pick location. The hollow shaft 50 may be the second planetary shaft 28, or a portion thereof, or may be a separate shaft coaxially aligned with the second planetary shaft 28. The vacuum is applied to remove the article 54 from the pick location, is maintained during the transfer to the placement or delivery location, and is removed to release the article 54 at the place location. The article transfer mechanism 18 is generally disposed outwardly from the second planetary shaft 28.

Primary and Secondary Motion

Figure 6:
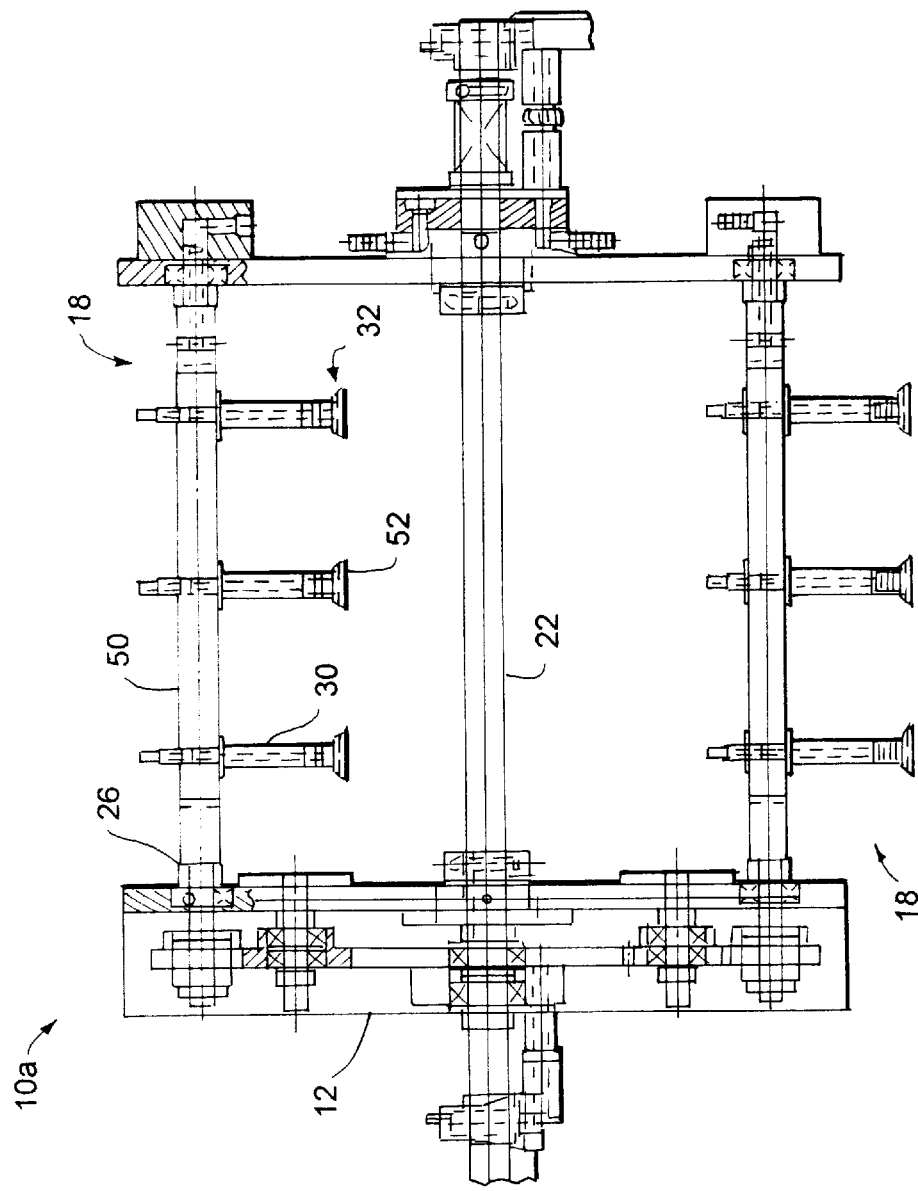
FIG. 6 is a front plan view of the rotary transfer device of FIG. 5.
Figure 5:
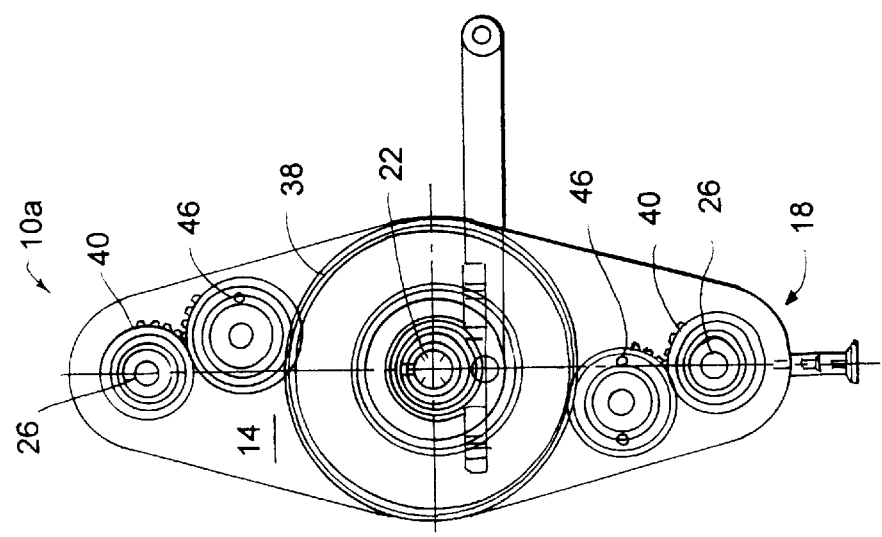
FIG. 5 is a side plan view of a two arm, three-stop, no-secondary motion rotary transfer apparatus that may produce the time-location diagram of FIG. 1.

As mentioned above, the rotary transfer apparatus 10 moves in a primary motion and a secondary motion to achieve a desired product or transfer path. The primary motion is described in reference to a rotary transfer apparatus without secondary motion 10a, which is illustrated in FIGS. 5–6. The rotary transfer apparatus without secondary motion 10a generally includes the frame structure, a rotatable main shaft 22 that is driven by a drive source and is supported by the frame structure, and a primary body 14 connected to the main shaft 22. At least one first planetary shaft 26 is rotatably connected to the primary body 14 and rotates in relation to the main shaft 22. An article transfer mechanism 18 is attached to and rotates with each planetary shaft 26.

The resulting product or transfer path for this apparatus 10a is generally illustrated by the time-location diagram of FIG. 1. Two segments are shown: a set of primary body line segments 56 representing the length from the center of the main shaft 22 to the center of the first planetary shaft 26, i.e. the vacuum shaft 50; and a set of stem line segments 58 representing the length from the tip of the suction cups 52 to the center of the vacuum shaft 50. The stem 30 rotates about the vacuum shaft 50 to form apexes 36 in the product path 34. The illustrated three-stop apparatus produces three apexes because the gear ratio between the primary planetary gear 40 and the primary stationary gear 38 is 3:1. If the illustrated embodiment is rotated in the direction of the arrow, the articles may be picked at 10 o'clock and placed at 6 o'clock. The apparatus may be rotated in the other direction and other pick and place points may be used.

Two potential problems can be seen with respect to the three-stop, no secondary motion rotary transfer apparatus. First, the articles 54 turn in towards the main shaft 22 so that for every 120° of travel about the main shaft 22, the article 54 rotates 240°. This extra motion may hinder the overall pick and place processing speed, can cause articles traveling between different apexes to contact each other, and can also cause the articles to contact or slap against the main shaft. Second, the apexes 36 have a significant taper indicating that the articles 54 and the stem 30 do not move in an in-line motion at the apex 36. Therefore, the articles 54 are rotated too near the apex points of pick and place, causing deeply nested products or products with a relatively long product tail to interfere with magazines or conveyors. This interference is illustrated by the overlapping images at the article tail 60. This interference may cause the articles to be creased, broken or otherwise damaged and/or may cause the article transfer mechanism 18 to lose its grip of the articles at these points. Therefore, an extended in-line motion at the apexes 36 of the product path is desirable.

Figures 3, 4:
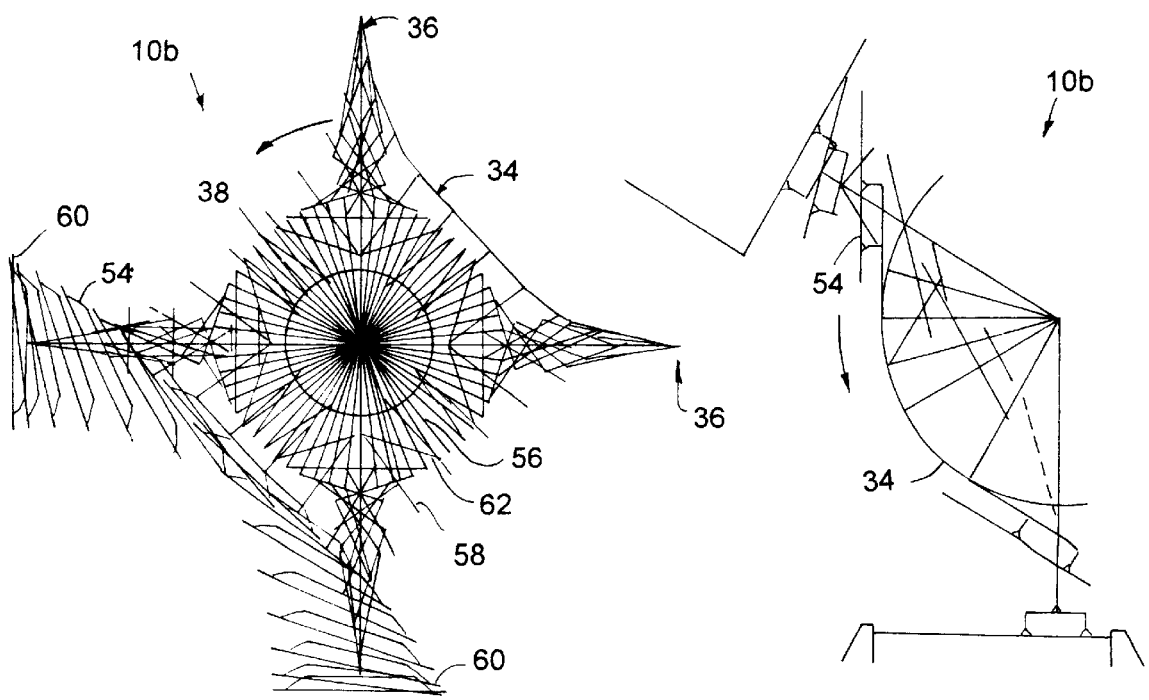
FIG. 3 is a time-location diagram of the three-stop, secondary motion rotary transfer apparatus of FIG. 2 in which an article is picked from a magazine and placed on a conveyor.
FIG. 4 is a geometric, time-location diagram which shows the transfer path of an article in a four-stop, secondary motion rotary transfer apparatus.

Secondary motion, such as that generated by a rotary transfer apparatus with secondary motion 10b as illustrated in FIGS. 7–8, is generally illustrated by the time-location diagram of FIG. 2 and FIG. 4. There are now three segments shown. The set of primary body line segments 56 represents the length from the center of the main shaft 22 to the center of the first planetary shaft 62. The set of secondary body line segments 62 represents the length from the center of the first planetary shaft 26 to the center of the second planetary shaft 28, i.e. the vacuum shaft 50. The set of stem line segments 58 represents the length from the tip of the suction cups 52 to the center of the vacuum shaft 50.

The problems discussed with respect to the three stop, no secondary motion apparatus 10a represented by FIG. 1 are at least somewhat alleviated by adding the secondary motion. For example, with a 1:1 gear ratio between the secondary stationary gear 42 and the secondary planetary gear 44, the article 54 will remain oriented away from the main shaft 22. This secondary motion arrangement is particularly useful for the movement and placement of relatively large articles such as cartons or articles with longer tails 60, for example because the dimension requirements of the rotary transfer device do not need to accommodate the movement of these large articles in the interior of the apparatus. In the case of a three-stop apparatus, illustrated in FIGS. 2–3, in which there is a 3:1 gear ratio between the primary planetary gear 40 and the primary stationary gear 38, the articles 54 will only rotate 120° for every 120° of travel about the main shaft 22. The result is less overall product motion and a degree of in-line motion at the apexes 36, which results in less product rotation near the points of place and pick, and ultimately results in less damage to the articles and greater overall precision.

As illustrated in FIG. 4, a four-stop, secondary rotary transfer apparatus 10b, in which there is a 4:1 gear ratio between the primary planetary gear 40 and the primary stationary gear 38, results in a greater degree of in-line motion at the apexes 36 and less product rotation near the points of place and pick. In addition to the longer in-line motion, the four-stop, secondary rotary transfer apparatus may have a longer stem length 30 and 58 which is desirable to securely contact deeply nested articles. If the illustrated embodiment is rotated in the direction of the arrow, the articles are picked at 9 o'clock and placed at 6 o'clock. The apparatus may be rotated in the other direction and other pick and place points may be used.

Detailed Elements Of A Secondary Motion Rotary Transfer Apparatus

Referring to FIGS. 7–8, the illustrated rotary transfer apparatus 10 has a frame structure 12, a drive source 24, and a vacuum source conduit 64, which is connected to a vacuum pump (not shown). The frame structure 12 is generally of a rigid, tubular metal construction, or the like. The frame structure 12 can be designed and constructed to cooperate with a variety of mechanized operations, machines or devices, such as assembly lines, packaging equipment or conveyor systems, which require the removal, transfer and/or deposit of certain articles, such as cartons, cups, labels, etc. The illustrated frame structure 12 is generally a free standing unit placed on the floor or on a stand in proximity to a conveyor system, or the like, but it can also be constructed as part of such equipment.

The main shaft 22 is journaled to the frame structure 12. The shaft 22 is rotatable and is driven by a motor or other drive source 24. As illustrated in FIG. 8, a vertical drive shaft 66 may be connected to the drive source 24 at one end and a bevel drive gear 68 at its opposite, upper end. A bevel drive gear 70 in communication with the bevel drive gear 68 is mounted to the main shaft 22 to drive it and the components attached or mounted thereto, and those in communication with those components. Although not specifically shown in the drawings, the drive source 24, such as a direct drive motor adapted for rotating the drive shaft, may alternatively comprise an arrangement of gears, sprockets and chains, and/or pulleys and belts.

Mounted to the main shaft 22 and for rotation therewith is the primary body 14 that is generally comprised of two opposing side plate members 76 and 74. Additional side plate members 72 may be used stabilization and protection purposes. The primary stationary gear 38 is immovably fixed or mounted to the frame structure 12 by means of an anchor bar member 78. Thus, the primary body 14 rotates with the main shaft 22 while the primary stationary gear 38 remains in a fixed position.

The primary planetary gear 40 and first planetary shaft 26 rotate about the primary stationary gear 38 through the first idler gear 46, which meshes in rotational communication with the primary stationary gear 38 and the primary planetary gear 40. As is further shown, an idler shaft extends through the first idler gear 46 and between plates 72 and 76, while the first planetary shaft 26 extends through the primary planetary gear 40 and is mounted between these same two plates 72 and 76. Thus, as the plate members 72 and 76 are rotated by the main shaft 22, the first idler gear 46 is driven by virtue of its communication with the primary stationary gear 38 and the primary planetary gear 40 is rotated in the opposite direction with respect to the idler gear 46.

The gear ratio between and the initial respective positions of the primary planetary gear 40 and the primary stationary gear 38 determines the number and location of the apexes or the outward positions of the elements affixed to the primary planetary gear 40. For example, a gear ratio of 3:1 results in three apex positions since the primary planetary gear 40 revolves three times for each orbit around the primary stationary gear 38. The precise repeatability of these apex positions enables the apparatus to perform a predetermined function at these locations, such as pick, print and glue. The circumference, i.e. number of teeth, of first the idler gear 46 does not affect the number of apex positions. Therefore, the same idler gear 46 may be used for a 3:1 planetary gear or a 4:1 planetary gear simply by changing its location to accommodate a different sized planetary gear 40.

The first planetary shaft 26 extends inwardly from the primary planetary gear 40 and the primary body 14, and the secondary body 16, generally comprised of plate members 80 and 82, is mounted thereto for rotation with the first planetary shaft 26. The secondary stationary gear 42 is mounted between the plates 80 and 82 and about the first planetary shaft 26. An anchor member 84 or similar device rigidly connected between the secondary stationary gear 42 and the plate members of the primary body 14, holds the secondary stationary gear stationary 42 with respect to the primary body 14.

The secondary planetary gear 44 rotates about the secondary stationary gear 42 through a second idler gear 48. The second planetary shaft 28 extends inward and is rotated with the secondary planetary gear 44. The article transfer mechanism 18 includes a hollow rotatable transfer shaft 50 having journals that form the secondary planetary shaft 28, a vacuum manifold 86 and at least one outwardly extending vacuum cup 52. The vacuum cup members may be adjustably mounted to a slotted mounting plate which permits the adjustment of the vacuum cups to conform to the requirements of the article to be transferred. The number and arrangement of vacuum cups used within the article transfer mechanism may be modified to properly grasp the article, as the dimensions of article require. In a square arrangement of four vacuum cups, an in-line motion allows each the cups to effectively contact the articles. The distance between the end of the vacuum cups and the rotatable transfer shaft is referred to as a stem length, and longer stem lengths are advantageous and necessary for deeply nested articles. However, the size and shape of the articles and the dimensions of the rotary transfer apparatus itself limit the size of the stem.

Although the apparatus 10 shown in FIG. 7 is designed to have three article transfer mechanisms 18, the third has been omitted to more clearly illustrate the gears in the secondary body. The transfer mechanisms 18 are driven, as shown, by the meshing secondary planetary gear 44 and second idler gear 48 which rotate relative to the secondary stationary gear 42 as part of the secondary body 16, which in turn rotates with respect to the primary body 14. This same rotating means is used to drive the other transfer mechanisms 18.

Hollow stems are in communication with the vacuum cups and with the manifold and the hollow shaft. Interiorly slotted and ported vacuum valves, i.e. a metal valve with ports and a rotating nylon valve with aligned slots, are connected to a vacuum source through a conduit and alternatively control the vacuum applied at the cups.

As shown in FIG. 8, the vacuum source conduit 64 connectably communicates with the cooperating slotted and ported vacuum valves. These interiorly slotted valves are generally known in the art, and they produce the predetermined application of vacuum at the article transfer mechanism via a number of hoses and hollow shafts. Specifically, a vacuum hose 180 extends from the slotted valves and is in communication with the hollow shaft 182, which is in communication with the hollow shaft 50, which is shaft 28, by means of the vacuum hose 184. The vacuum manifold 86 is in communication with the vacuum shaft 50, and a pair of vacuum hoses 186 respectively communicate with vacuum cups 52. The cooperating slotted vacuum valves are preferably rotationally adjustable for fine tuning the precise locations of vacuum operability at the apex positions of the article transfer mechanisms. The valves preferably are provided with cooperating features adapted for stopping the vacuum of the rotary device when the article supply has been depleted or when a product source on which the articles are to be placed has been stopped. These features are provided by the use of additional ports in the nylon valve, and the use of electric eyes, micro-switches and the use of solenoid valves.

Figure 17:
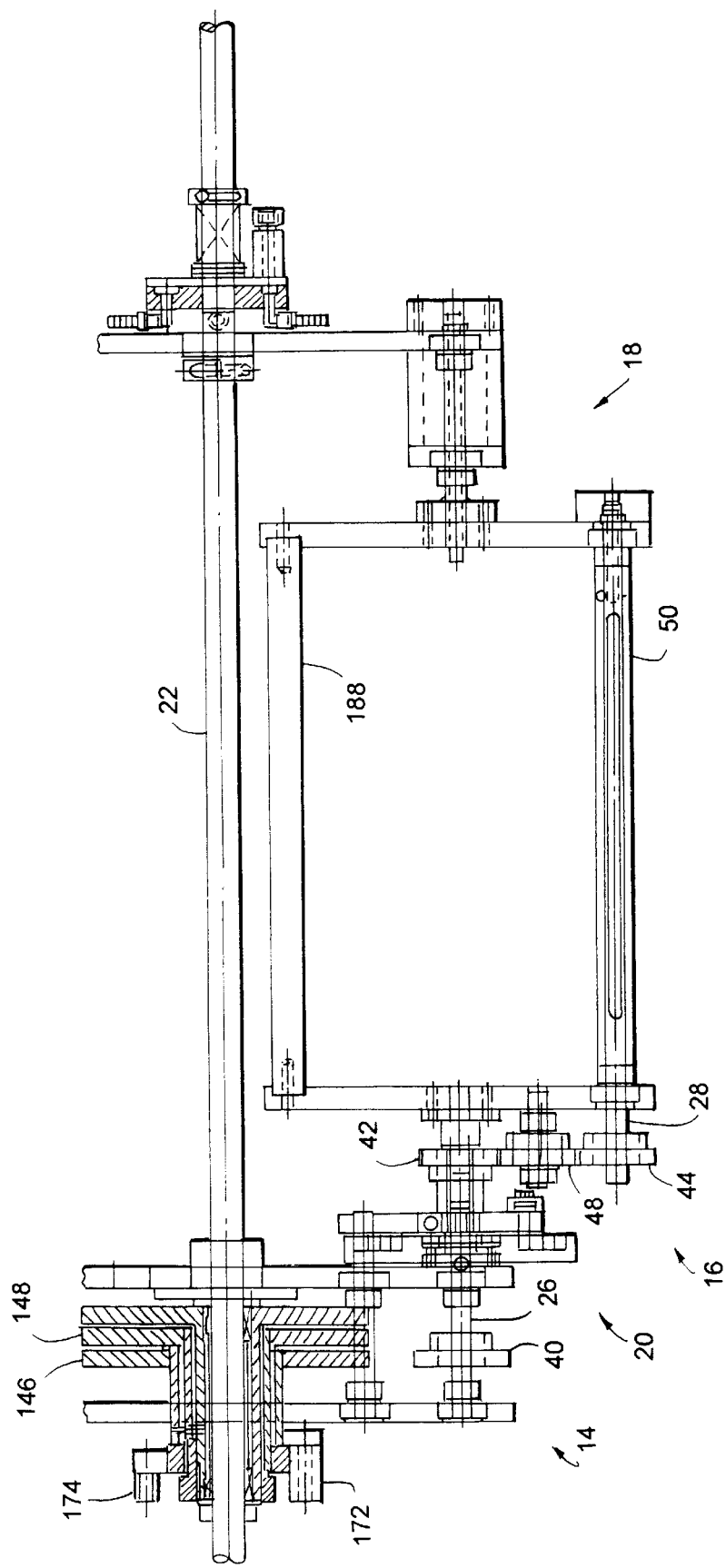
FIG. 17 is a front view illustrating a secondary motion rotary transfer apparatus with an in-line cam mechanism and with multiple primary "stationary" or center gears, each adapted for being independently influenced by an advancing cam mechanism.
Figure 18:
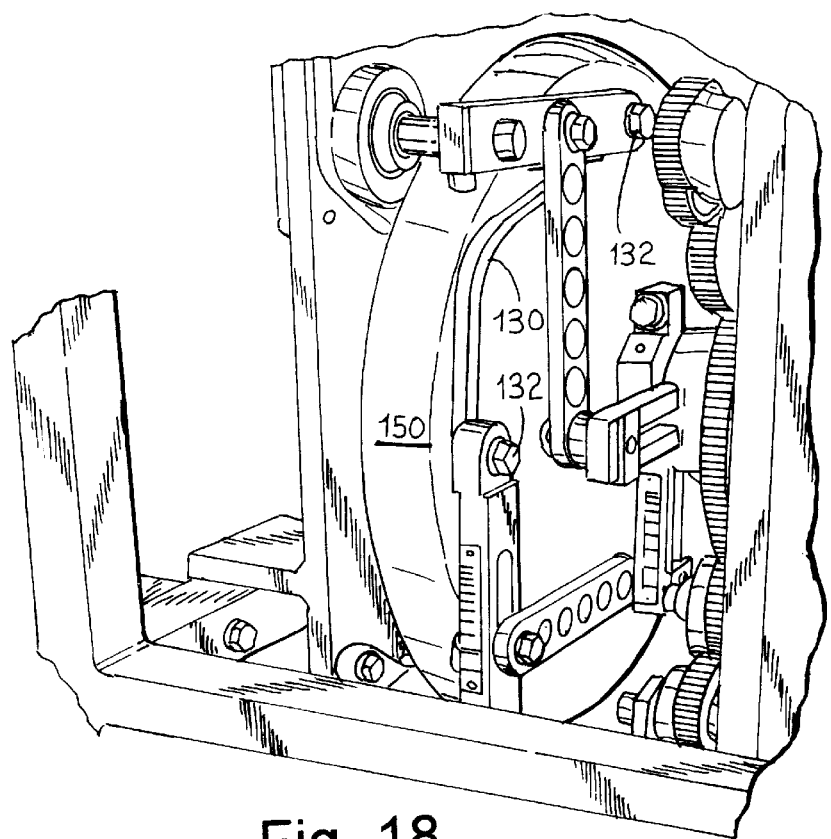
FIG. 18 is a perspective view of the rotary transfer apparatus of FIG. 15.
Figure 19:
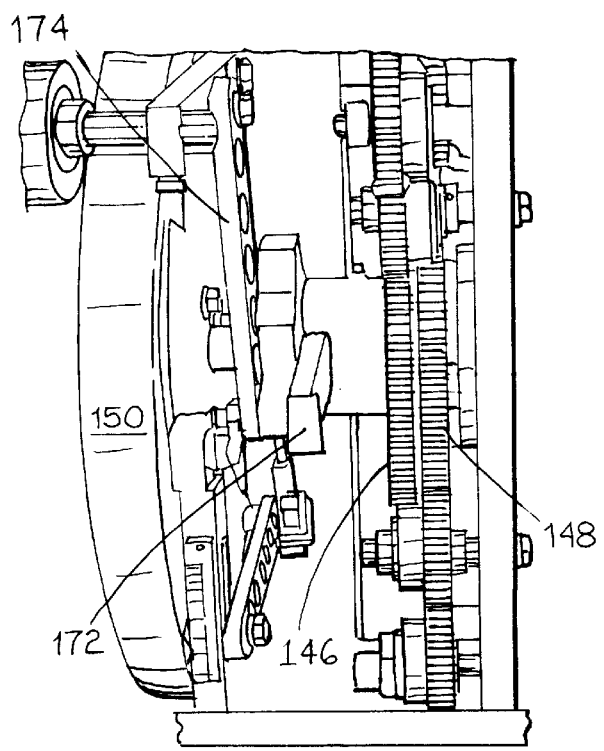
FIG. 19 is a front view of the rotary transfer apparatus of FIG. 15.

Depending upon the nature and speed of the rotary transfer apparatus, it may be necessary or desirable to attach counter balance weights 188 at the interior upper portions of the plate members, for example, as shown in FIG. 17 to provide a smooth and continuous motion.

In-Line Cam Mechanism

In a secondary motion, rotary transfer apparatus, the in-line cam mechanism 20 extends the in-line motion of the stem 30 by providing an oscillating rotational offset motion to a second planetary shaft 28. The benefit of this oscillating rotational offset motion is illustrated, wherein FIG. 23 illustrates the motion of a secondary motion, rotary transfer apparatus 10b advancing 30° about the primary stationary gear 38 toward an apex 36 and FIG. 22 illustrates the motion of a secondary motion, rotary transfer apparatus with an in-line cam mechanism 10c receding 30° about the primary stationary gear 38 away from an apex 36. Without the in-line cam mechanism 20, the stem 30, 58 undergoes a relatively significant rotation, which may result in damaging nested or rigid articles. The cup 52 follows a tapered path 88 in toward the apex while the second planetary shaft 28, i.e. the joint between stem line segment 58 and the secondary body line segment 62, extends on the opposite side of the in-line path 90. With the in-line cam mechanism 20, the stem 30, 58 undergoes significantly less rotation. The cup 52 follows the in-line path 90 and the second planetary shaft 28 remains more closely aligned with the in-line path 90.

Referring now to FIGS. 20–21 and again to FIG. 7, the second planetary shaft 28 is attached to the secondary planetary gear 44, which is in rotational communication with the secondary stationary gear 42. The in-line cam mechanism 20 oscillates the secondary stationary gear 42 to provide the desired oscillating rotational offset motion to the second planetary shaft 28. A variety of cam system designs may be used. The in-line cam mechanism 20 includes a cam structure 92 connected to or otherwise adapted to rotate with the first planetary shaft 26. The illustrated cam structure 92 has a predetermined cam contour 94, a cam follower 96 adapted to cooperate with the cam contour 94 of the cam structure 92, and a cam linkage 98 adapted for linking the cam follower 96 to the secondary stationary gear 42. A rise and fall motion of the cam follower 96, in the direction of the arrows, oscillates the secondary stationary gear 42. For example, each cam linkage 98 may include a lever arm 100 and a linkage arm 102. The lever arm 100 has a first portion 104 pivotally attached to the primary body 14, a second portion 106 connected to the cam follower 96, and a third portion 108 hinged to the linkage arm 102. The linkage arm 102 is operably linked to the secondary stationary gear 42. The predetermined rise and fall movement of the cam follower 96 causes the lever arm 100 to pivot, which causes the linkage arm 102 to provide the desired oscillating rotational offset to the secondary stationary gear 42.

Referring now to FIGS. 24–25 along with FIG. 22, the secondary stationary gear 42, and ultimately the second planetary shaft 28, is oscillated through a controlled motion and a harmonic motion as the distal end of the stem 30 recedes from the apex 36 and through a harmonic motion and a controlled motion as the stem 30, 58 advances toward the apex 36. The controlled motion is the predetermined offset for the second planetary shaft 28 that provides the desired extended in-line motion in the in-line path 90 rather than the tapered path 88 that results for a secondary motion apparatus without an in-line cam mechanism. The cam structure 92, and in particular the profile 110 of the cam contour 94, is designed to create the desired controlled motion toward and away from the apex. For example, in a four-stop, secondary motion rotary transfer apparatus, the path has four apexes. Each second planetary shaft 28 undergoes one full 360° rotation as it travels 90° about the primary stationary gear 38 between successive apexes. Therefore, the cam contour 94 includes portions for controlling the motion receding away from the apex and advancing toward the apex.

The desired cam profile 110 for the controlled portions is determined by working backwards from the desired in-line motion, i.e. determining the required offset from stem line segments 58a that produce the tapered path 88 to stem line segments 58b that produce the in-line path 90. As illustrated in FIG. 25, a required offset angle for the second planetary shaft may be determined for every degree of rotation near the apex, for example 30° about the primary stationary gear 38 or 120° of the cam structure 92 in the four-stop apparatus. As seen, either no or a minimal amount of offset is required during the first 10° or 11° of rotation about the primary stationary gear 38. Thus, the first 43° of the cam profile may be a dwell portion in which there is no rise or fall in the cam follower 96. Thereafter, however, a more substantial offset of the second planetary shaft 28 is required to prevent the stem 30 from rotating and to maintain the cup in the in-line path 90, thus requiring a predetermined control portion. The desired offset of the second planetary shaft 28 as determined in FIG. 25 is converted into a desired rise of the cam follower for the cam profile 110 of FIG. 24. This relationship depends on the geometry of the cam linkage 98 and the mechanical advantage of any levers contained therein. In order to make a smooth transition between a receding motion from one apex to an advancing motion toward another, the cam profile 110 includes a harmonic portion adapted to provide a smooth transition into another dwell portion by the halfway point between apexes, i.e. 180° of the cam. A mirror image of the cam profile designed to recede the stem from an apex in an in-line or near in-line motion may be used to advance the stem toward an apex in a similar in-line or near in-line motion.

Therefore, as illustrated in FIG. 24, the cam contour 94 has a profile 110 that comprises an apex dwell portion 112, a receding controlled motion portion 114, a receding harmonic motion portion 116, a transition dwell portion 118, an advancing harmonic motion portion 120, and an advancing controlled motion portion 122. In a preferred embodiment for a four-stop, secondary motion rotary transfer apparatus, the apex dwell portion 112 produces no rotational offset motion to the second planetary shaft 28 and occurs between 0° and 43° and the mirrored apex dwell portion 112 occurs between 317° and 360° in the cam structure 92, wherein 0° in the cam structure 92 corresponds to each apex 36. An angle of 43° in the cam structure 92 corresponds to about 10.75° of rotation about the primary stationary gear 38 because of the 4:1 gearing relationship in the four-stop apparatus. The controlled motion portion 114, 122 produces the desired oscillating rotational offset for the second planetary shaft 28. The receding controlled motion portion 114 occurs between 43° and 120° in the cam structure 92 and the mirrored advancing controlled motion portion 122 occurs between 240° and 317° in the cam structure 92. The harmonic motion portions 116, 120 produces a rotational offset motion for the second planetary shaft 28 to provide a smooth transition between apexes 36. The receding harmonic motion portion 116 occurs between 120° and approximately 165° and the mirrored advancing harmonic motion portion 120 occurs between approximately 195° and 240°. The transition dwell portion 118 occurs between the harmonic motion portions 116, 120, i.e. between approximately 165° and 195° of the cam structure 92.

Advancing Cam Mechanism

In many article transfer processes, relative movement between the article and the placement location, i.e. the conveyor 124 or the object on the conveyor, for example, present problems for precisely placing articles 54. For example, placing coupons or labels on moving objects such as packages or placing window elements on cartons is inherently difficult and may cause damage if there is relative movement between the individual coupon and package, particularly in high speed placement operations. The advancing cam mechanism 126 overcomes this difficulty by incorporating an intermittent and synchronized advancing motion as the article is deposited so that the article is placed while in motion onto the moving target. Other applications for the advancing cam mechanism are anticipated. For example, a bar code on the articles may be advanced or swept past a bar code reader at one of the apexes.

An advancing cam mechanism (ACM) 126 is illustrated with a non-secondary motion rotary transfer apparatus in U.S. Pat. No. 4,901,843, which is assigned to Applicants' assignee and is herein incorporated by reference. However, as illustrated in FIG. 17, the advancing cam mechanism 126 may be used with a rotary transfer apparatus with secondary motion. The advancing cam mechanism 126 rotates or oscillates the center gear 38, ie. the previously "stationary" gear, at predetermined times as the article transfer mechanisms 18 approach one of the apex positions to place or pick the article. Various cam, cam follower, and cam linkage arrangements may be incorporated into the advancing cam mechanism, which itself may be incorporated into apparatus that have a plurality of center gears and article transfer mechanisms.

The advancing cam mechanism 126 accelerates the article at an apex position of the product path so that the speed of the article substantially matches the speed of the conveyor or the object on the conveyor. This apex position 36 of travel is shown to be at the bottom of the rotary transfer apparatus where the article is released onto the moving object. However, as mentioned above, other applications may require a similar advance at another apex or point of delivery.

Figure 13:
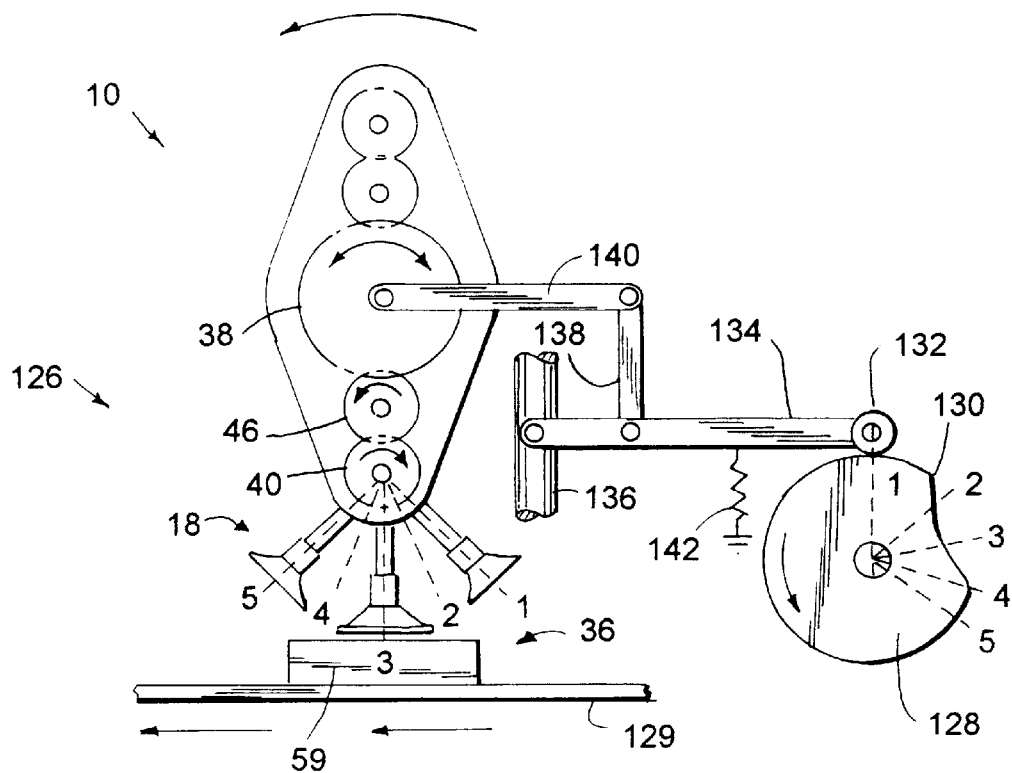
FIG. 13 is a side view of a non-secondary motion rotary transfer apparatus with an advancing cam mechanism.

FIG. 13 illustrates a geometric time-location diagram that shows the advancing motion of the article transfer mechanism 18 at its lower apex or placement position of travel at which point the article is placed onto the moving object. The illustrated advancing cam mechanism 126 has an open cam structure 128 with a cam curvature configuration or track 130. Other cam structures may be used. A cam roller or follower 132 is rotatably connected at one end of a cam roller arm 134, which has a fixed pivotal connection to a frame 136 at its opposite end. A pivot connection between the ends of the arm attaches a linkage arm 138 to the advancing linkage 140. Biasing means 142 is connected to the cam roller arm 134 to maintain contact of the cam roller 132 with the peripheral cam track surface 130. The opposite end of the advancing linkage 140 is fixed to the center gear 38 directly or to the center shaft if the center gear is fixed thereto, so that the up and down movement to the end of advancing linkage 140, as shown by the arrow with respect to linkage arm 138, directly results in the oscillating motion of the center gear 38 as also shown by the arrows thereon. Particularly, FIG. 13 illustrates the movement of the article transfer mechanism 18 with respect to the corresponding location of the cam roller to the exterior curved locations of the cam track 130, marked by Positions 1, 2, 3, 4 and 5, as the cam 128 is rotated in a synchronized manner with the rotary transfer apparatus 10.

In one machine cycle of a standard rotary transfer apparatus having a stationary gear 38, the article transfer mechanism picks up an article from a magazine at an apex position at zero speed. In other words, the vacuum cups momentarily stop at that position to pick an article as the vacuum is actuated. Thereafter, the article transfer mechanism 18 undergoes constant rotational speed or motion with respect to the supporting plates until it reaches the placement location where the mechanism reaches another apex position and releases the article, again at zero speed, as the vacuum is deactivated. Thereafter, the article transfer mechanism again travels at constant speed until it reaches its original apex position depending upon the gear ratios between the center or stationary gear and the planetary gears. For example, a third apex position can be provided so that an article can make contact with a glue station prior to placement.

In a machine cycle of a rotary transfer apparatus with an advancing cam mechanism 126, a different motion begins after the article is removed from the storage magazine where the article transfer mechanism is at its first apex position and has momentary zero speed. Thereafter, the article transfer mechanism undergoes standard constant motion until, due to a change in the cam track curvature 130 as shown in Position 1, for example, the article transfer mechanism 18 is decelerated. In contrast to the constant motion of the normal operation of the device, the vacuum cups of the article transfer mechanism 18 back up due to the decelerating motion caused by the cam track 130. Thereafter at Position 2, the article transfer mechanism begins to accelerate until it reaches or matches the velocity of the object on which it is placed at Position 3. The article transfer mechanism continues or follows through by accelerating at Position 4 until the vacuum cups are returned to their normal position in comparison to the standard operation of a stationary gear rotary device at Position 5. The article transfer mechanism travels at its normal or standard speed thereafter until another article is removed at the magazine as the mechanism reaches zero speed at the first apex position. As the article reaches the lower apex position of travel, the decelerated and accelerated movement as described above with respect to Positions 1–5 is repeated.

FIG. 15 is an exploded view which further shows the elements and cooperating structure of the device and the advancing motion mechanism of this invention. The transfer device is shown to have opposing side plate structures 142, the near plate structure having a guard enclosure 144. The device has two center gears, namely an outside center gear 146 and an inside center gear 148. As further shown in FIG. 16, the outside center gear 146 drives one set of article transfer mechanisms by driving one pair of journaled idler gears which are in communication with one set of planetary gears, while inside center gear 148 drive another set of article transfer mechanisms by driving idler gears which are in communication with the other set of planetary gears.

The center gears 146, 148, as well as the cam structure 150, timing pulley 152, drive pulley 154 and the vacuum valve 156 are mounted to the main shaft 22, which utilizes pillow block bearing structures 158, a taperlock bushing 160 used to secure the pulley onto the main shaft 22, and a bearing structure 162 to unite the assembly about the side plate structures 142 for use. The vacuum cup shafts 164 have journaled ends 166 and have vacuum blocks 168 that are communicatively connected via vacuum lines 176 to the valve 156 to activate and deactivate the cups at predetermined times and locations. Advancing linkage 172 is connected to and extends from the center gear 146 and advancing linkage 174 extends through the slot in the center gear 146 and is connected to the center gear 148 by fasteners or bolts. Thus, the advancing linkage 174 reciprocates through the center gear 146, as further shown in FIG. 16.

The illustrated center shaft 22 of the rotary apparatus has the closed cam structure 150 mounted for rotation therewith. Thus, as the cam followers 132 ride inside the cam track slot 130, the respective cam roller arms being pivotally fixed at frame points cause their respective linkage arms to impart oscillating motion to the respective advancing linkage members which are respectively connected to the outside and inside center gears. To maintain a smooth operation of four transfer mechanisms devices, it is beneficial to drive a first pair of opposing transfer mechanisms about a first center gear and to drive a second pair of opposing transfer mechanisms about a second center gear. This arrangement allows the two pairs of transfer mechanisms to be oscillated independent of each other. Therefore, one center gear can be oscillated for the desired acceleration of the transfer mechanism as it places an article without adversely affecting the accuracy of another transfer mechanism as it picks an article.

Figure 14:
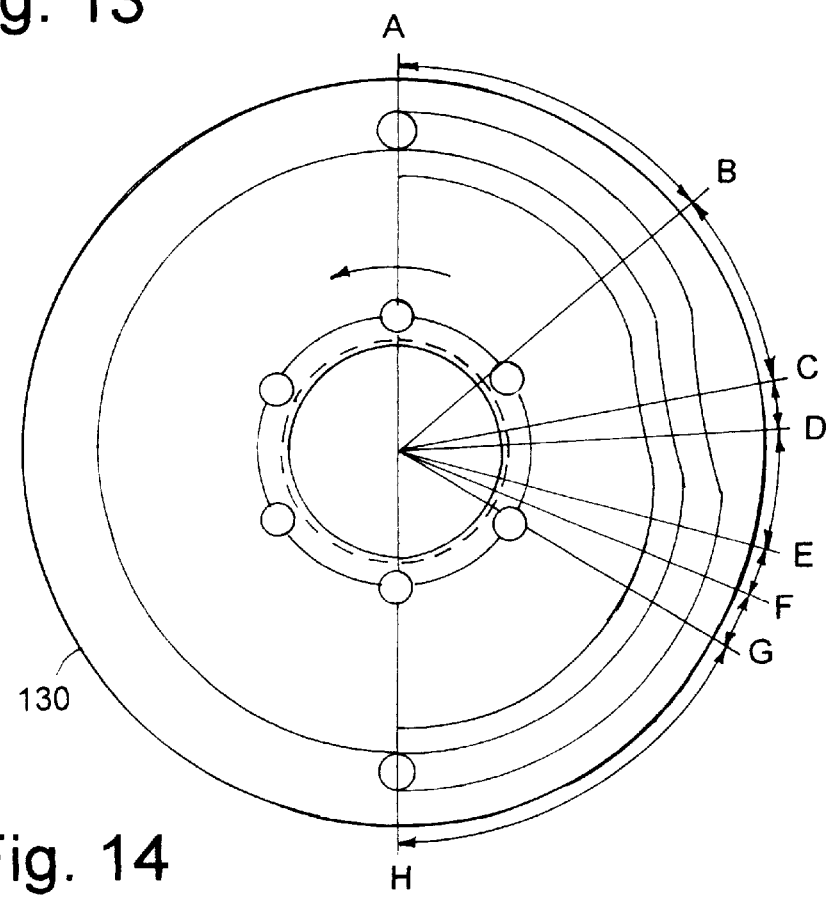
FIG. 14 is a schematic side plan view of a cam structure of an advancing cam mechanism.

FIG. 14 illustrates a closed cam structure 130 and FIG. 16 shows the linkage for the advancing cam mechanism 126. The closed cam structure 130 has an interiorly disposed cam curvature slot or cam track 130 for receiving the cam followers 132. The cam curvature slot is shown to have specific dwell times and specific slopes to produce the advancing motion of the article transfer mechanisms. The cam track curvature or radial change with respect to the center of the cam directly affects the movement of the cam followers. Thus, the locations marked A–H provide the accelerated and decelerated positions of the cam followers. The closed cam structure has two such opposing curved configurations so that two cam followers are able to be actuated as the cam structure rotates.

Thus, the configuration of the cam track determines both the change in rotational velocity or acceleration as well as the duration of this change for the article transfer apparatus. As a result, the movement of the transferred articles can be easily controlled to match the conveyor speed to thereby accurately place articles onto high speed moving targets.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A rotary transfer apparatus, comprising:
   (a) a frame structure;
   (b) a rotatable main shaft supported by said frame structure;
   (c) a primary body connected to said main shaft;
   (d) at least one first planetary shaft rotatably connected to said primary body and rotating in relation to said main shaft;
   (e) a secondary body connected to each said first planetary shaft;
   (f) a second planetary shaft rotatably connected to each said secondary body and rotating in relation to said first planetary shaft;
   (g) an article transfer mechanism connected to each said second planetary shaft, said article transfer mechanism being adapted for transferring articles in a path about said main shaft, said path having at least one apex at which said articles move in an in-line motion; and
   (h) an in-line cam mechanism adapted for extending said in-line motion.

2. The rotary transfer apparatus of claim 1, further comprising:
   (a) a primary stationary gear connected to said frame structure, said main shaft extending through and rotating with respect to said primary stationary gear;
   (b) at least one primary planetary gear in rotational communication with said primary stationary gear and connected to each said first planetary shaft;
   (c) a secondary stationary gear corresponding to each said primary planetary gear, each said secondary stationary gear being connected to said primary body, each said first planetary shaft extending through and rotating with respect to each said secondary stationary gear; and
   (d) at least one secondary planetary gear in rotational communication with each said secondary stationary gear and connected to each said second planetary shaft.

3. The rotary transfer apparatus of claim 2, wherein both said primary body and said secondary body include a pair of parallel plates, said primary stationary gear and each said primary planetary gear being positioned between said plates of said primary body, each said secondary stationary gear and each said secondary planetary gear being positioned between said plates of said secondary body.

4. The rotary transfer apparatus of claim 3, wherein a primary idler gear is in rotational communication between said primary stationary gear and each said primary planetary gear, and a secondary idler gear is in rotational communication between each said secondary stationary gear and each said secondary planetary gear.

5. The rotary transfer apparatus of claim 2, wherein a primary gear ratio between each said primary planetary gear and said primary stationary gear is three-to-one and a secondary gear ratio between each said secondary planetary gear and each said secondary stationary gear is one-to-one, whereby said rotary transfer apparatus is a three-stop, secondary motion rotary transfer apparatus.

6. The rotary transfer apparatus of claim 2, wherein a primary gear ratio between each said primary planetary gear and said primary stationary gear is four-to-one and a secondary gear ratio between each said secondary planetary gear and each said secondary stationary gear is one-to-one, whereby said rotary transfer apparatus is a four-stop, secondary motion rotary transfer apparatus.

7. The rotary transfer apparatus of claim 1, comprising three first planetary shafts, three secondary bodies, three second planetary shafts and three article transfer mechanisms, each of said three first planetary shafts relating to one of said three secondary bodies, which relates to one of said three second planetary shafts, which relates to one of said three article transfer mechanisms.

8. The rotary transfer apparatus of claim 1, wherein each said in-line cam mechanism is adapted for providing an oscillating rotational offset motion to each said second planetary shaft.

9. The rotary transfer apparatus of claim 8, wherein each said in-line cam mechanism includes a rotating cam structure and a cooperating cam follower adapted for oscillating each said second planetary shaft through a controlled motion and a harmonic motion as said articles recede from each said apex and through a harmonic motion and a controlled motion as said articles advance toward each said apex, said controlled motion of each said second planetary shaft providing said extended in-line motion.

10. The rotary transfer apparatus of claim 9, wherein said path has four apexes and each said second planetary shaft undergoes one full 360° rotation traveling between successive apexes, each said cam structure having a cam contour comprising an apex dwell portion, a receding controlled motion portion, a receding harmonic motion portion, a transition dwell portion, an advancing harmonic motion portion, and an advancing controlled motion portion, said apex dwell portion producing no rotational offset motion to each said second planetary shaft for at least the first 40° of said cam structure receding from each said apex and at least the last 40° of said cam structure advancing toward each said apex.

11. The rotary transfer apparatus of claim 8, wherein each said second planetary shaft is attached to a secondary planetary gear, each said secondary planetary gear being in rotational communication with a secondary stationary gear, each said in-line cam mechanism being adapted for oscillating each said secondary stationary gear to provide said oscillating rotational offset motion to each said second planetary shaft.

12. The rotary transfer apparatus of claim 11, wherein each said in-line cam mechanism includes a cam structure adapted to rotate with each said first planetary shaft wherein each said cam structure has a predetermined cam contour, a cam follower adapted to cooperate with said cam contour of each said cam structure, and a cam linkage adapted for linking said cam follower to said secondary stationary gear, whereby a rise and fall motion of said cam follower oscillates said secondary stationary gear.

13. The rotary transfer apparatus of claim 12, wherein each said cam linkage includes a lever arm and a linkage arm, said lever arm having a first portion pivotally attached to said primary body, a second portion connected to each said cam follower, and a third portion hinged to said linkage arm, said linkage arm being operably linked to each said secondary stationary gear, whereby movement of said cam follower causes said lever arm to pivot and causes said linkage arm to provide a rotational offset to said secondary stationary gear.

14. The rotary transfer apparatus of claim 1, further including an advancing cam mechanism adapted for accurately placing said articles on a moving object, wherein a velocity of said articles is matched with a velocity of said object.

15. The rotary transfer apparatus of claim 14, wherein said advancing cam mechanism includes at least one ACM rotating cam structure adapted for rotating with said main shaft and for oscillating said primary stationary gear through a controlled motion and a harmonic motion to accelerate and decelerate said articles.

16. The rotary transfer apparatus of claim 15, further comprising at least one primary stationary gear connected to said frame, at least one cooperating ACM cam follower, and at least one ACM cam linkage, said main shaft extending through and rotating with respect to each said primary stationary gear, each said ACM cam linkage adapted for linking each said ACM cam follower to each said primary stationary gear, whereby said rise and fall motion of each said ACM cam follower oscillates each said primary stationary gear.

17. The rotary transfer apparatus of claim 16, wherein said at least one primary stationary gear is on e stationary gear and said at least one ACM cam structure is one ACM cam structure, said ACM cam structure being adapted for oscillating said primary stationary gear to control motion in one set of secondary bodies.

18. The rotary transfer apparatus of claim 16, wherein said at least one primary stationary gear is two primary stationary gears and said at least one ACM cam structure is two ACM cam structures, each of said two ACM cam structures being adapted for oscillating one of said two primary stationary gears to separately control motion in two sets of secondary bodies.

19. A secondary motion rotary transfer apparatus, comprising:

(a) a frame structure;

(b) a rotatable main shaft supported by said frame structure;

(c) a primary stationary gear connected to said frame structure, said main shaft extending through and rotating with respect to said primary stationary gear;

(d) a primary body connected to said main shaft;

(e) at least one first planetary shaft rotatably connected to said primary body;

(f) at least one primary planetary gear in rotational communication with said primary stationary gear and connected to each said first planetary shaft;

(g) a secondary body connected to each said first planetary shaft;

(h) a secondary stationary gear corresponding to each said primary planetary gear, each said secondary stationary gear being connected to said primary body, each said first planetary shaft extending through and rotating with respect to each said secondary stationary gear;

(i) a second planetary shaft rotatably connected to each said secondary body;

(j) at least one secondary planetary gear in rotational communication with each said secondary stationary gear and connected to each said second planetary shaft (k) an article transfer mechanism connected to each said second planetary shaft, said article transfer mechanism being adapted for picking and placing articles, said article transfer mechanism having at least one stem connected to said second planetary shaft, said stem having a distal end whose motion defines a path about said main shaft, said path having at least one apex at which said distal end of said stem moves in an in-line motion; and (l) an in-line cam mechanism adapted for extending said in-line motion by providing an oscillating rotational offset motion to each said second planetary shaft, each said in-line cam mechanism including a rotating cam structure and a cooperating cam follower adapted for oscillating each said second planetary shaft through a controlled motion and a harmonic motion as said distal end of said stem recedes from each said apex and through a harmonic motion and a controlled motion as said stem advances toward each said apex, said controlled motion of said second planetary shaft providing said extended in-line motion.

20. A four stop, secondary motion rotary transfer apparatus with an in-line cam feature and an advancing cam feature, comprising:

(a) a frame structure;

(b) a rotatable main shaft supported by said frame structure;

(c) a primary stationary gear connected to said frame structure, said main shaft extending through and rotating with respect to said primary stationary gear;

(d) a primary body connected to said main shaft;

(e) at least one first planetary shaft rotatably connected to said primary body;

(f) at least one primary planetary gear in rotational communication with said primary stationary gear and connected to each said first planetary shaft;

(g) a secondary body connected to each said first planetary shaft;

(h) a secondary stationary gear corresponding to each said primary planetary gear, each said secondary stationary gear being connected to said primary body, each said first planetary shaft extending through and rotating with respect to each said secondary stationary gear;

(i) a second planetary shaft rotatably connected to each said secondary body;

(j) at least one secondary planetary gear in rotational communication with each said secondary stationary gear and connected to each said second planetary shaft (k) an article transfer mechanism connected to each said second planetary shaft, said article transfer mechanism being adapted for picking and placing articles, said article transfer mechanism having at least one stem connected to said second planetary shaft, said stem having a distal end whose motion defines a path about said main shaft, said path having at least one apex at which said distal end of said stem moves in an in-line motion;

(l) an in-line cam mechanism adapted for extending said in-line motion by providing an oscillating rotational offset motion to each said second planetary shaft, each said in-line cam mechanism including a rotating cam structure adapted for rotating with each said first planetary shaft wherein each said cam structure has a predetermined cam contour, a cam follower adapted to cooperate with said cam contour of each said cam structure, and a cam linkage adapted for linking each said cam follower to each said secondary stationary gear, wherein a rise and fall motion of each said cam follower oscillates each said secondary stationary gear, which oscillates each said second planetary shaft through a controlled motion and a harmonic motion as said distal end of said stem recedes from each said apex and through a harmonic motion and a controlled motion as said stem advances toward each said apex, said controlled motion of said second planetary shaft providing said extended in-line motion; and (m) an advancing cam mechanism adapted for matching an article velocity with an object velocity as an article is placed on a moving object, said advancing cam mechanism including at least one rotating ACM cam structure and at least one cooperating ACM cam follower adapted for oscillating said main shaft through a controlled motion and a harmonic motion to accelerate and decelerate said article.

\* \* \* \* \*